United States Patent [19]

Tanigawa

[11] Patent Number: 5,501,828
[45] Date of Patent: Mar. 26, 1996

[54] METHOD FOR PRODUCING A WEAR-DETECTION PROBE FOR A BRAKE LINING MATERIAL

[75] Inventor: Fumiyoshi Tanigawa, Mie, Japan

[73] Assignee: Sumitomo Wiring Systems, Ltd., Mie, Japan

[21] Appl. No.: 353,359

[22] Filed: Dec. 5, 1994

Related U.S. Application Data

[63] Continuation of Ser. No. 45,228, Apr. 13, 1993, abandoned.

[30] Foreign Application Priority Data

Jul. 8, 1992 [JP] Japan .................... 4-206033

[51] Int. Cl.⁶ .................... B29C 53/02; B29C 70/72
[52] U.S. Cl. .................... 264/138; 264/263; 264/272.15; 264/294; 29/883
[58] Field of Search .................... 264/263, 278, 264/279.1, 294, 295, 275, 277, 265, 271.1, 161, 163, 39, 138, 272.11, 272.15; 29/883, 876; 249/91, 96; 425/117, 129.1

[56] References Cited

U.S. PATENT DOCUMENTS

| | | | |
|---|---|---|---|
| 3,415,115 | 12/1968 | Newell | 73/121 |
| 3,674,114 | 7/1972 | Howard | 340/454 |
| 3,689,880 | 9/1972 | Mckee et al. | 340/454 |
| 3,886,517 | 5/1975 | Ohtake et al. | 340/52 F |
| 3,894,901 | 7/1975 | Breher | 264/278 |
| 3,896,205 | 7/1975 | Broker et al. | 264/278 |
| 4,016,533 | 4/1977 | Ishikawa et al. | 340/454 |
| 4,147,236 | 4/1979 | Steffen et al. | 340/454 |
| 4,292,267 | 9/1981 | Haynes | 264/278 |
| 4,318,457 | 3/1982 | Dorsch et al. | 340/454 |
| 4,437,547 | 3/1984 | Harmer | 340/454 |
| 4,520,661 | 6/1985 | Tamai et al. | 73/129 |
| 4,562,421 | 12/1985 | Duffy | 340/454 |
| 4,606,435 | 8/1986 | Johnson | 340/454 |
| 4,646,001 | 2/1987 | Baldwin et al. | 340/454 |
| 5,158,734 | 10/1992 | Nees | 264/278 |

FOREIGN PATENT DOCUMENTS

| | | |
|---|---|---|
| 0321661 | 9/1988 | European Pat. Off. . |
| 0465954 | 1/1992 | European Pat. Off. . |
| 2504226 | 4/1981 | France . |
| 1045259 | 11/1958 | Germany . |
| 2407517 | 8/1975 | Germany ................ 340/454 |
| 3904673 | 8/1990 | Germany . |
| 9010354 | 9/1990 | Germany . |
| 6297332 | of 0000 | Japan . |
| 55-149434 | 11/1980 | Japan . |
| 495701 | 3/1992 | Japan . |
| 2015099 | 9/1979 | United Kingdom ........ 340/454 |
| 2058968 | 4/1981 | United Kingdom . |
| 2194824 | 3/1988 | United Kingdom . |

OTHER PUBLICATIONS

Japanese Unexamined Utility Model Publication No. 62-97332, Jun. 20, 1987.

*Primary Examiner*—Jan H. Silbaugh
*Assistant Examiner*—Angela Ortiz
*Attorney, Agent, or Firm*—Sughrue, Mion, Zinn, Macpeak & Seas

[57] ABSTRACT

A production method is provided which can reduce the number of working steps, shorten a production time, increase a strength of a probe, and prevent a U-turned portion (61) from shifting in a probe member (50P). The method provides a positioning pin (100) disposed inside a U-turned portion (61) of an insulated electrical wire (60) as an insert in the probe member (50P) upon mold-forming. According to the method, since the positioning pin (100) is left inside the U-turned portion (61), a pin drawn-out hole is not formed in the probe member, thereby increasing the strength of the probe. The U-turned portion (61) is disposed in position by the positioning pin (100), thereby preventing the U-turned portion (61) from shifting in the probe member (50P). Also, since the pin drawn-out hole is not formed in the probe member, it is not necessary to fill a packing material into the hole and to apply an adhesive to the inside wall of the hole or to the packing material and thereby the working steps can be reduced. Further, it is possible to shorten the production time as it is not necessary to wait until an adhesive has hardened.

3 Claims, 5 Drawing Sheets

METHOD FOR PRODUCING A WEAR-DETECTION PROBE FOR A BRAKE LINING MATERIAL

This is a Continuation of application Ser. No. 08/045,228 filed Apr. 13, 1993 now abandoned.

BACKGROUND OF THE INVENTION

1. Field of the Invention

This invention relates to a method for producing a wear-detection probe For a brake lining material such as a brake pad for a disc brake in a vehicle or the like.

2. Statement of the Prior Art

For convenience of explanation, a conventional wear-detection probe for a brake lining material will be described below by referring to FIGS. 5 through 9.

FIG. 5 is a cross-sectional view of a conventional disc brake For a vehicle. FIG. 8 is a plan view of a conventional wear-detection probe for a brake lining material. FIG. 7 is a perspective view illustrating a conventional process for producing a conventional probe. FIG. 8 is a cross-sectional view illustrating the conventional process for producing the conventional probe. FIG. 9 is a perspective view illustrating the conventional process for producing the conventional probe.

As shown in FIG. 5, a disc brake 1 for a vehicle generates a braking force when a pair of brake pads 3 or the like are pressed against the two sides of a rotor 2 which rotates under rotation of a wheel. In this disc brake 1, a probe 10 juxtaposed with the brake pad 3 detects the residual thickness of the pad 3 worn by contact with the rotor 2, so that a warning signal can be generated before the brake pads become overworn.

The wear-detection probe 10, as shown in FIG. 8, is made by mold-forming a resin material 12 around a U-turned portion 11a which is formed by bending a linear conductor such as an insulated electrical wire 11 or the like in a U-shape. The probe 10 is secured to the rear metal 3a of the brake pad 3 at a flange 10b so that the top end 10a of the probe 10 is directed to the rotor 2 and both ends of the insulated electrical wire 11 are drawn out of the probe 10 so as to be connected to an alarm circuit (not shown). The brake pad 3 is worn due to contact with the rotor 2 every time the brake is operated, and the top end 10a of the probe 10 is also worn with reduction of the residual thickness of the brake pad 3. Consequently, the U-turned portion 11a is gradually worn. When the residual thickness of the brake pad reaches a predetermined value, the U-turned portion 11a is cut off. The alarm circuit detects the disconnection of the U-turned portion and generates a warning signal.

In the probe 10, since a wear limit of the residual brake pad 3 is detected by the disconnection of the U-turned portion 11a, it is necessary to accurately position the U-turned portion 11a in the resin material 12, in particular, in a wear-progressing direction A (see FIG. 6) with respect to the residual thickness of the brake pad 3.

Accordingly, in a conventional method of producing the probe 10, as shown in FIG. 7, first, the insulated electrical wire 11 is disposed around a positioning pin 20 mounted in a metal mold member 30 to form the U-turned portion 11a, second, a metal mold comprising the metal mold member 30 and the other metal mold members (not shown) closes a space around the U-turned portion 11a of the insulated electrical wire 11 while holding the wire 11 by the pin 20 so that the wire does not shift in the mold, and third, a molten resin material is poured into the closed space and solidified in the mold. Thus, the insulated electrical wire 11 is correctly positioned in the molded resin material 12.

However, in the conventional method for producing the conventional wear-detection probe, after molding the probe a pin drawn-out hole 21 is left inside the U-turned portion 11a in a probe member 10P as shown in FIG. 8, since the positioning pin 20 is drawn out together with a molded article (probe member) upon removing the molded article from the metal mold. If the probe member 10P with the pin drawn-out hole 21 is used for the probe 10, the probe 10 is reduced in strength. Consequently, when a pushing force F (FIG. 6) caused by contact with the rotor 2 is applied to the top end 10a of the probe 10, the probe is easily broken. Further, the U-turned portion 11a is deflected into the hole 21, thereby displacing the disconnection position of the U-turned portion 11a, since the hole 21 is left inside the U-turned portion 11a.

Commonly, heretofore, as shown in FIG. 9, a packing material 22 or the like is filled in and secured to the pin drawn-out hole 21 by an adhesive to increase the strength of the probe 10, thereby preventing the U-turned portion 11a from being deflected into the hole. However, this increases the steps necessary for producing the probe including additional steps of inserting the packing material 22 into the hole 21 and applying the adhesive. Further, it is necessary to leave the probe 10 in the mold until the adhesive is hardened, thereby increasing a producing period in time.

SUMMARY OF THE INVENTION

An object of the present invention is to provide a method for producing a wear-detection probe for a brake lining material, which overcomes conventional problems described above and can reduce steps of working, shorten the producing time, increase a strength of the probe, and prevent a U-turned portion from shifting in the probe member.

In order to achieve the above object, a method for producing a wear-detection probe for a brake lining material in accordance with the present invention is directed to a probe in which a probe member is formed by winding in a U-like shape a linear conductor around an outer periphery of a barrel portion of a positioning pin stood in a metal mold and by making a mold-forming around a U-turned portion of said conductor with a resin material poured in the metal mold. The method is characterized in that the positioning pin is detachably mounted in the metal mold and the positioning pin is formed as an insert in the probe member upon making the mold-forming.

In the method for producing the wear-detection probe for the brake lining material in accordance with the present invention, since the positioning pin disposed inside the U-turned portion of the insulated electrical wire is made as an insert in the probe member upon mold-forming, the positioning pin is left inside the U-turned portion, the pin drawn-out hole is not formed in the probe member, thereby increasing the strength of the probe, and the U-turned portion is disposed in position by the positioning pin, thereby preventing the U-turned portion from shifting in the probe member. Also, since the pin drawn-out hole is not formed in the probe member, it is not necessary to fill a packing material into the hole, to apply an adhesive to the inside wall of the hole or to the packing material, and to reduce the steps of working. Further, it is possible to shorten

DETAILED DESCRIPTION OF THE PREFERRED EMBODIMENTS

Figure 1:
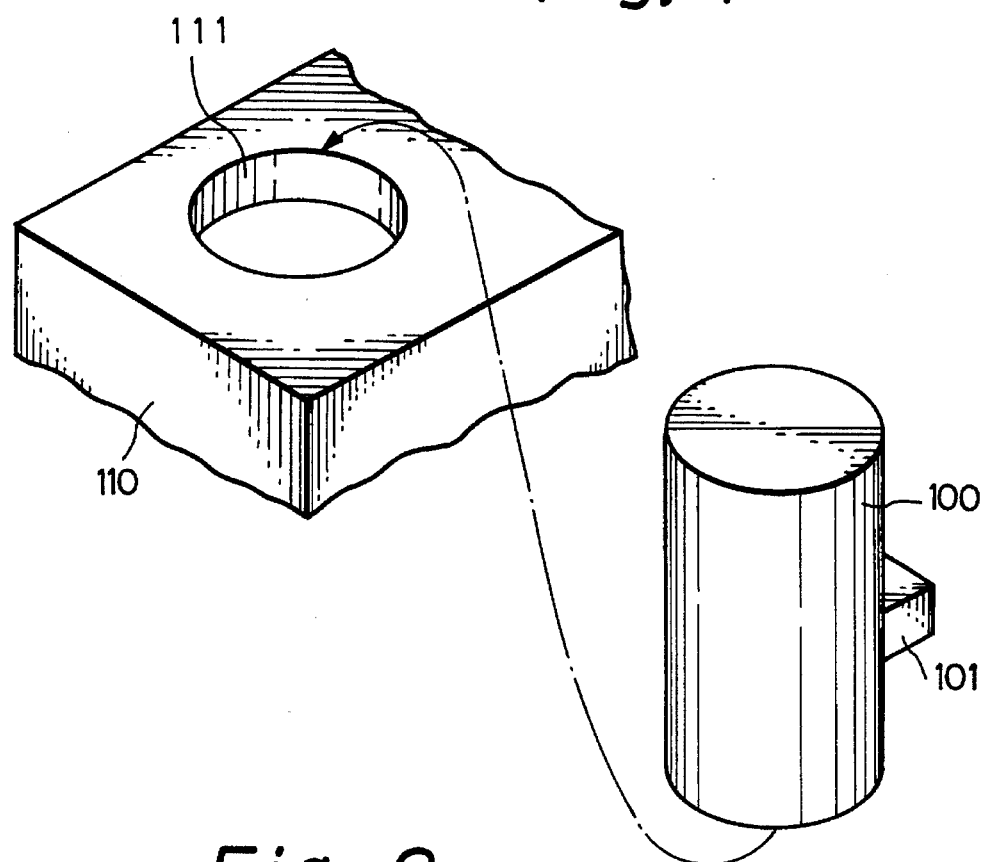
FIG. 1 is a perspective view illustrating an embodiment of a method for producing a wear-detection probe for a brake lining material in accordance with the present invention.

FIG. 1 is a perspective view illustrating an embodiment of a method for producing a wear-detection probe for a brake lining material in accordance with the present invention. As shown in FIG. 1, the method requires the preparation of a metal mold member 110 and a positioning pin 100 which is adapted to be detachably mounted on the member 110. The positioning pin 100 is provided with a stopper 101 extending in a direction perpendicular to the axis of the pin 100 at a barrel portion thereof. The metal mold member 110 is provided with a mating bore 111 which detachably receives an end of the positioning pin 100.

Figure 2:
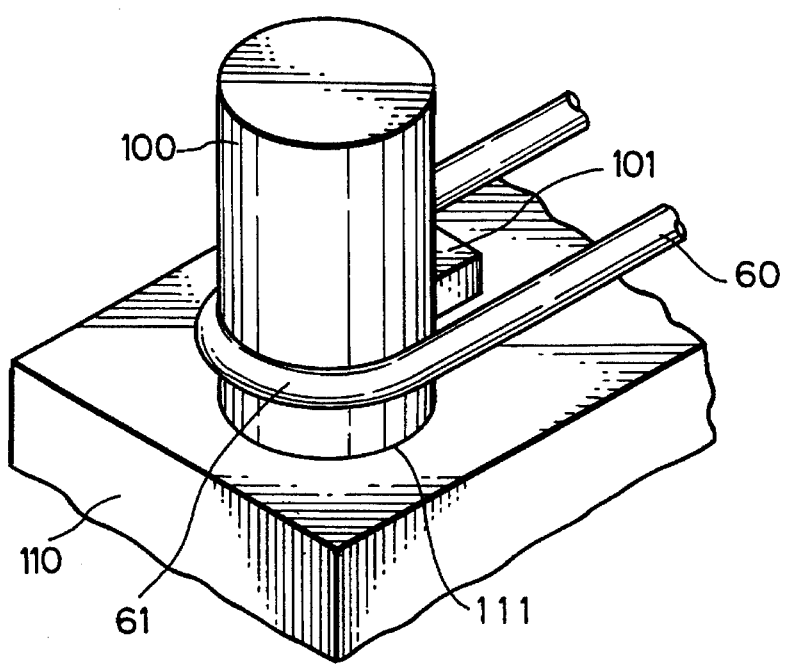
FIG. 2 is a perspective view illustrating an embodiment of a method for producing a wear-detection probe for a brake lining material in accordance with the present invention.

As shown in FIG. 2, the end of the positioning pin 100 is inserted into the mating bore 111 in the metal mold member 110 so that the pin 100 removably stands on the metal mold member 110. An insulated electrical wire 60 is wound around a barrel portion of the pin 100 to form a U-turned portion 61 and disposed in position. A metal mold (not shown) comprising the metal mold member 110 and other metal mold members (not shown) closes a space around the U-turned portion 61 of the insulated electrical wire 60. A molten resin material is poured into and solidified in the space.

Figure 3:
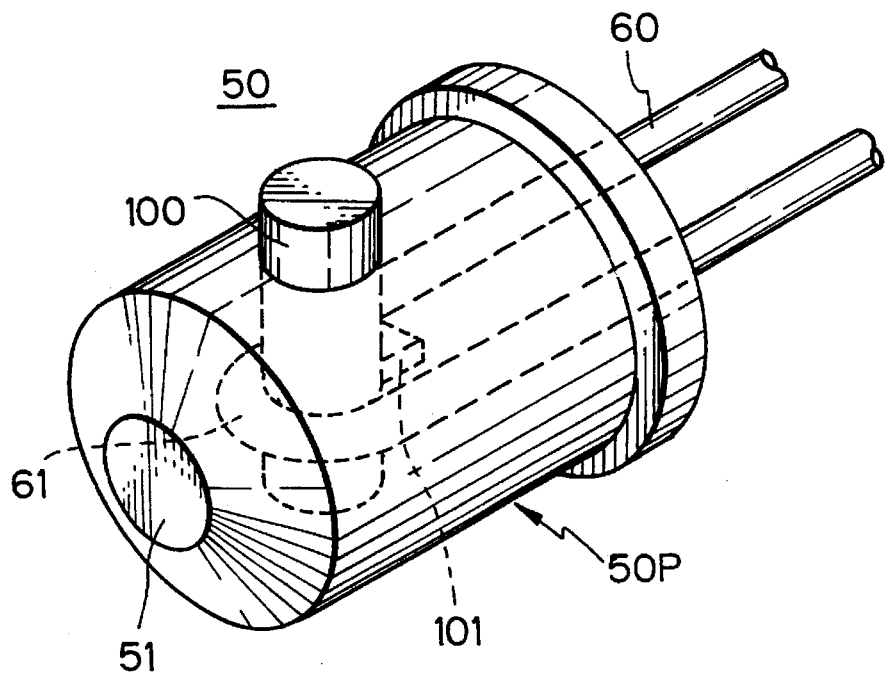
FIG. 3 is a perspective view of a wear-detection probe produced by the method of the present invention.
Figure 4:
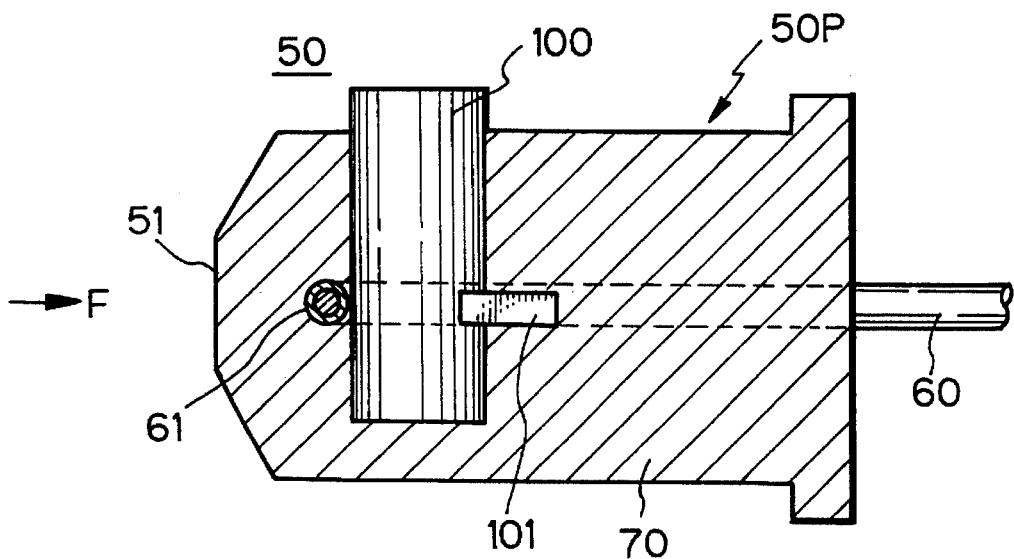
FIG. 4 is a longitudinal cross-sectional view of the wear-detection probe produced by the method of the present invention.
Figure 5:
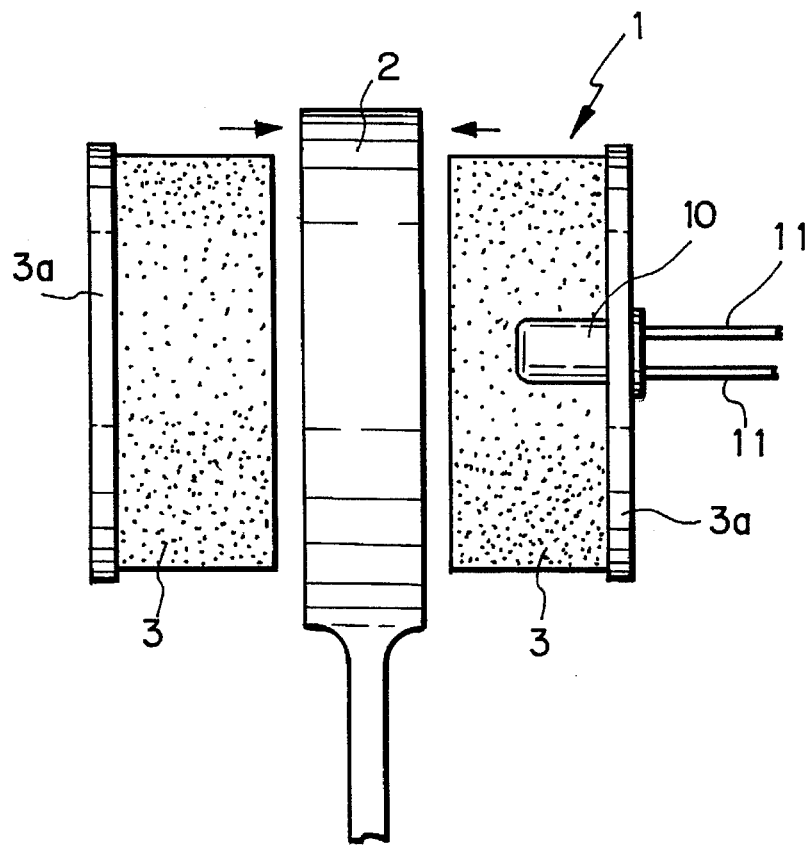
FIG. 5 is a cross-sectional view of a conventional disc brake for a vehicle.
Figure 6:
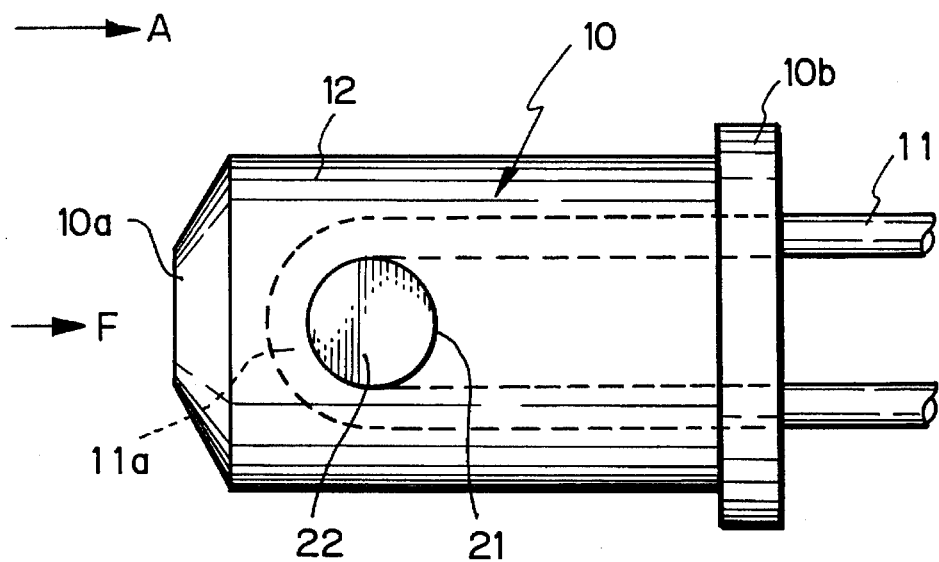
FIG. 6 is a plan view of a conventional wear-detection probe for a brake lining material.
Figure 7:
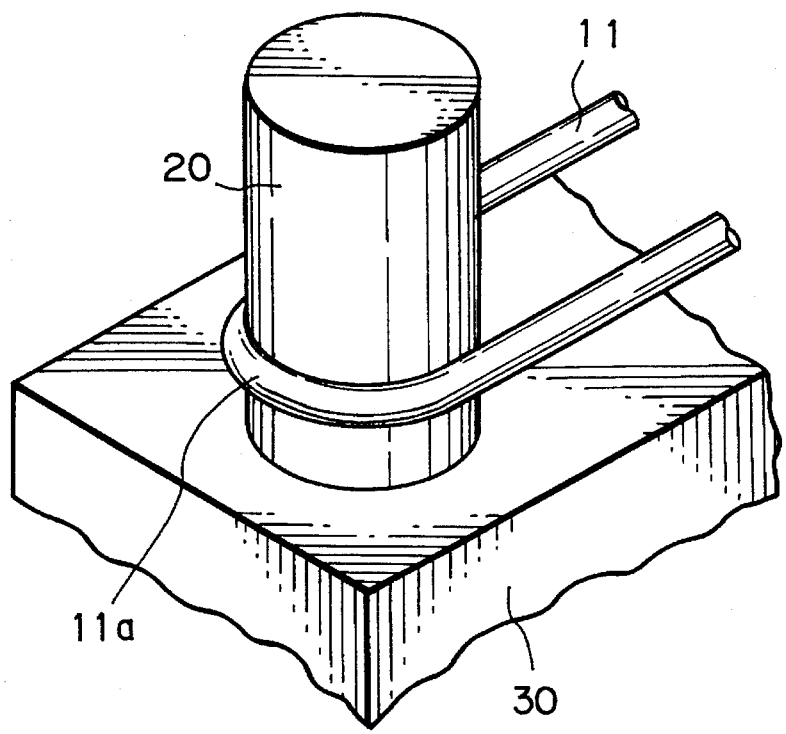
FIG. 7 is a perspective view illustrating a conventional process for producing a conventional probe.
Figure 8:
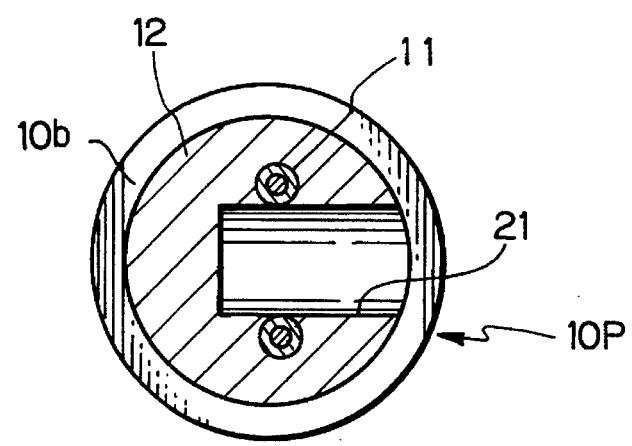
FIG. 8 is a cross-sectional view illustrating the conventional process for producing the conventional probe.
Figure 9:
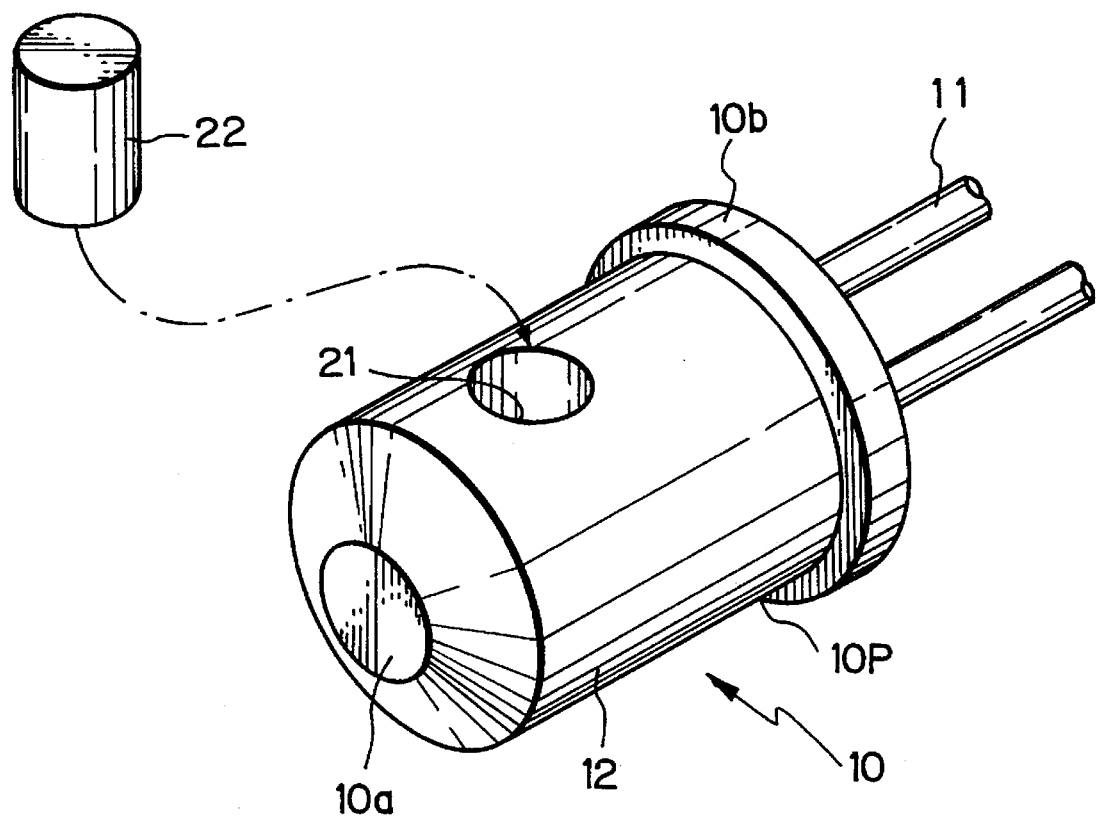
FIG. 9 is a perspective view illustrating the conventional process for producing the conventional probe.

Then, as shown in FIGS. 3 and 4, the positioning pin 100 is drawn out of the mating bore 111 in the metal mold member 110 so that a resin-molded article (a probe member 50P) is removed from the metal mold. The probe member 50P has the positioning pin 100 provided inside the U-turned portion 61 of the insulated electrical wire 60 as an insert. The probe member 50P is used for a wear-detection probe 50.

Since the positioning pin 100 is formed as an insert inside the U-turned portion 61 in the probe 50, the pin 100 is left inside the U-turned portion 61 and thus the pin drawn-out hole is not formed in the probe 50. Accordingly, even if the pushing force F (FIG. 4) caused by the contact with the rotor is applied to a top end 51 of the probe 50, the top end 51 is not broken but merely worn. In addition, since the U-turned portion 61 is disposed in position by the positioning pin 100, even if the pushing force F is applied to the top end 51, the U-turned portion 61 is prevented from shifting in the probe member and it is possible to correctly detect that the residual thickness of the brake pad reaches the given value.

Also, since the pin drawn-out hole is not formed in the probe member, it is not necessary to insert a filling material into the hole and to apply the adhesive to the hole or the filling material after mold-forming, thereby decreasing the step of processing. Further, it is not necessary to wait for hardening the adhesive and the producing period of time can be shortened.

As shown in FIG. 4, since the stopper 101 is provided on the barrel portion of the positioning pin 100 in the direction perpendicular to the axis of the pin 100, the stopper 101 embedded in a molded resin material 70 can prevent the positioning pin 100 from failing out of the probe 50.

In the above embodiment, although an area (one end portion) of the positioning pin 100 fitted in the mating bore 111 in the metal mold member 110 is projected from the outer surface of the probe member 50P, the projected portion may be cut off, if desired.

According to the method for producing the wear-detection probe for the brake lining material in accordance with the present invention, since the positioning pin disposed inside the U-turned portion of the insulated electrical wire is formed as an insert in the probe member upon mold-forming, the positioning pin is left inside the U-turned portion, the pin drawn-out hole is not formed in the probe member, thereby increasing the strength of the probe, and the U-turned portion is disposed in position by the positioning pin, thereby preventing the U-turned portion from shifting in the probe member. Also, since the pin drawn-out hole is not formed in the probe member, it is not necessary to fill a packing material into the hole, to apply an adhesive to the inside wall of the hole or to the packing material, and to reduce the steps of working. Further, it is possible to shorten the producing period of time without waiting for hardening the adhesive.

What is claimed is:

1. A method of making a wear-detection probe for a brake lining, comprising the steps of:

a) preparing a metal mold including a set of metal mold members and a positioning pin including a stopper extending from a side portion thereof;

b) removably disposing said positioning pin in a mating bore in a given one of said metal mold members of said metal mold so that said positioning pin stands upright on said given one of said metal mold members by means of said stopper;

c) bending a linear conductor around said positioning pin until a U-turned portion of the conductor is formed about said positioning pin;

d) enclosing said positioning pin and said U-turned portion by the other metal mold members of said metal mold to form a given interior space;

e) pouring a molten resin material into said given interior space to form a resin molded housing about the U-turned portion of the conductor and at least a portion of the positioning pin which includes the stopper; and f) removing said resin molded housing from said metal mold while leaving said positioning pin inside said resin molded housing so as to form a permanent insert in the probe.

2. The method as claimed in claim 1, wherein an end portion of said positioning pin is projected from an outer surface of the probe.

3. The method as claimed in claim 2, further comprising the step of cutting off said end portion of said positioning pin projecting from the probe.

* * * * *